United States Patent Office 3,342,124
Patented Sept. 19, 1967

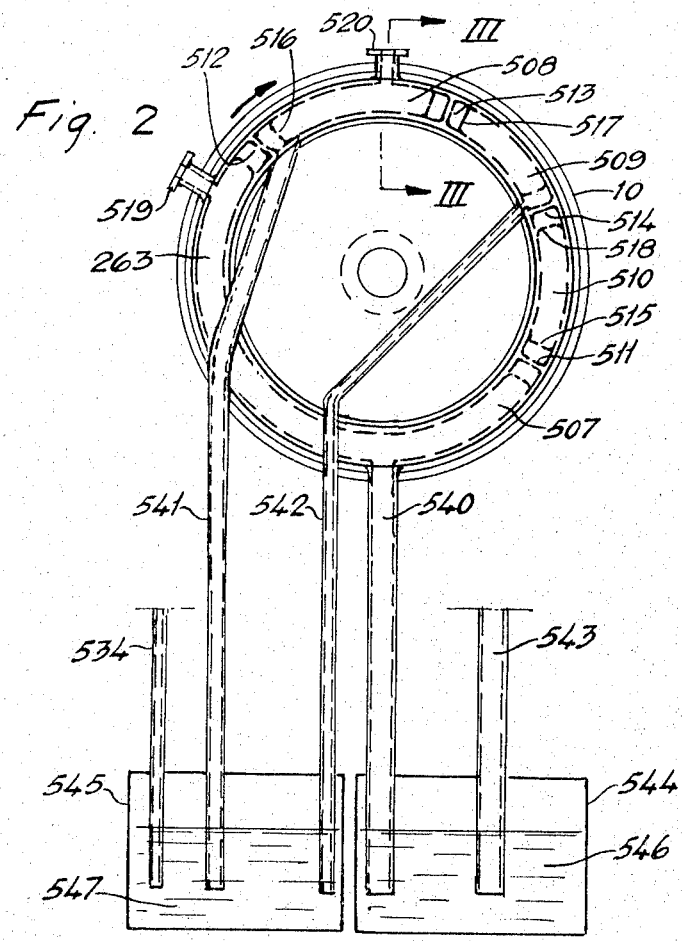

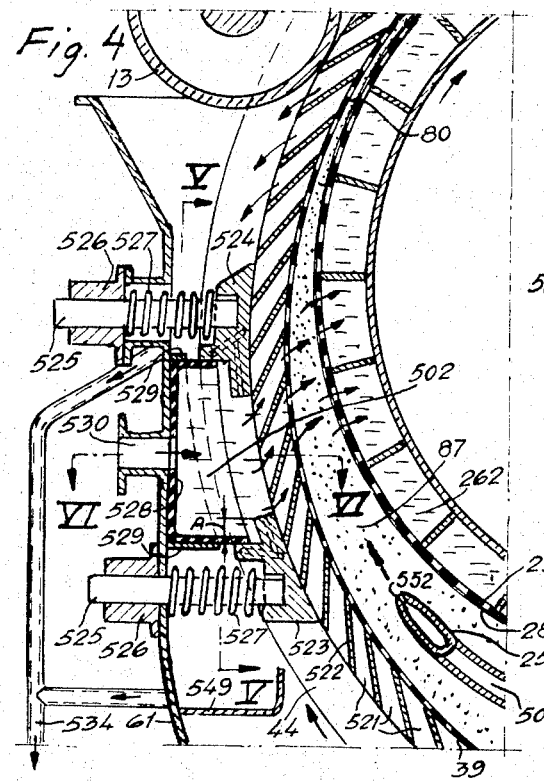
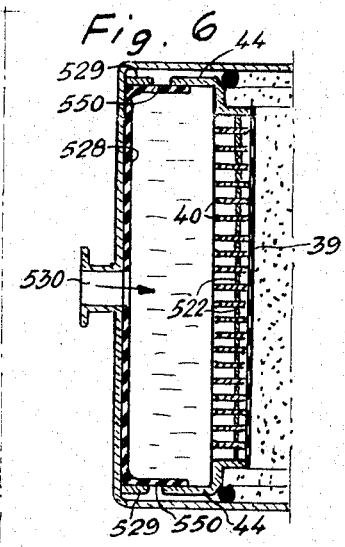
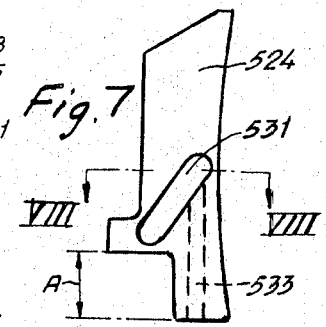
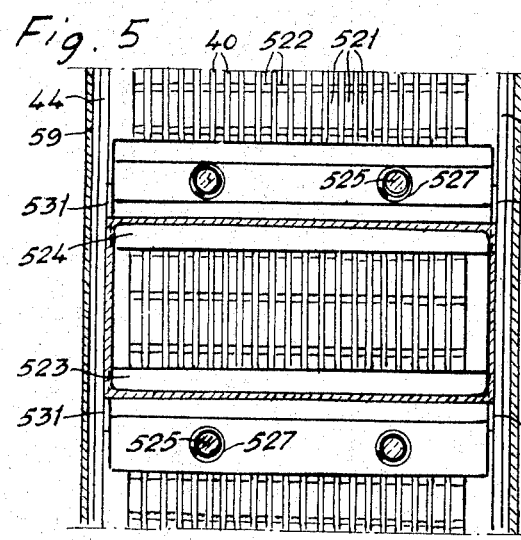
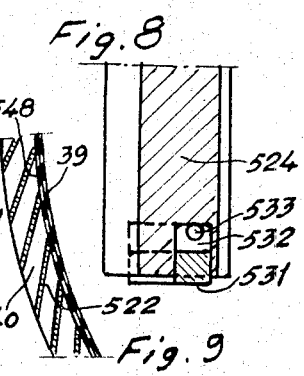

3,342,124
APPARATUS FOR DEWATERING AND RINSING HYDROUS SUBSTANCES
Rune Helmer Frykhult, Johanneshov, Sweden, assignor to Aktiebolaget A. Ekströms Maskinaffar, Stockholm, Sweden, a Swedish joint-stock company
Filed Mar. 15, 1965, Ser. No. 439,848
Claims priority, application Sweden, Mar. 10, 1964, 3,495/64
13 Claims. (Cl. 100—121)

ABSTRACT OF THE DISCLOSURE

The apparatus relates to dewatering and rinsing of hydrous substances, particularly fiber pulp suspensions and includes an inner rotary screen drum and an outer rotary screen drum. Means are provided in the space between the inner and outer drums for supplying the hydrous substance and further means are located in the space between the drums and beneath the outer drums for removing the resulting product and liquid removed therefrom. The drums are so disposed that a nip is provided therebetween and the outer drum is defined by an inner thin screen casing adapted to be surrounded by an outside perforated wall. The outer drum is also provided at the outside thereof with spaced annular-shaped members with a relatively great height to width ratio which constitute stiffening means and trailing wall members are provided between adjacent stiffening means for constituting together with such stiffening means cell structures having no circumferential intercommunication.

---

Figure 1:
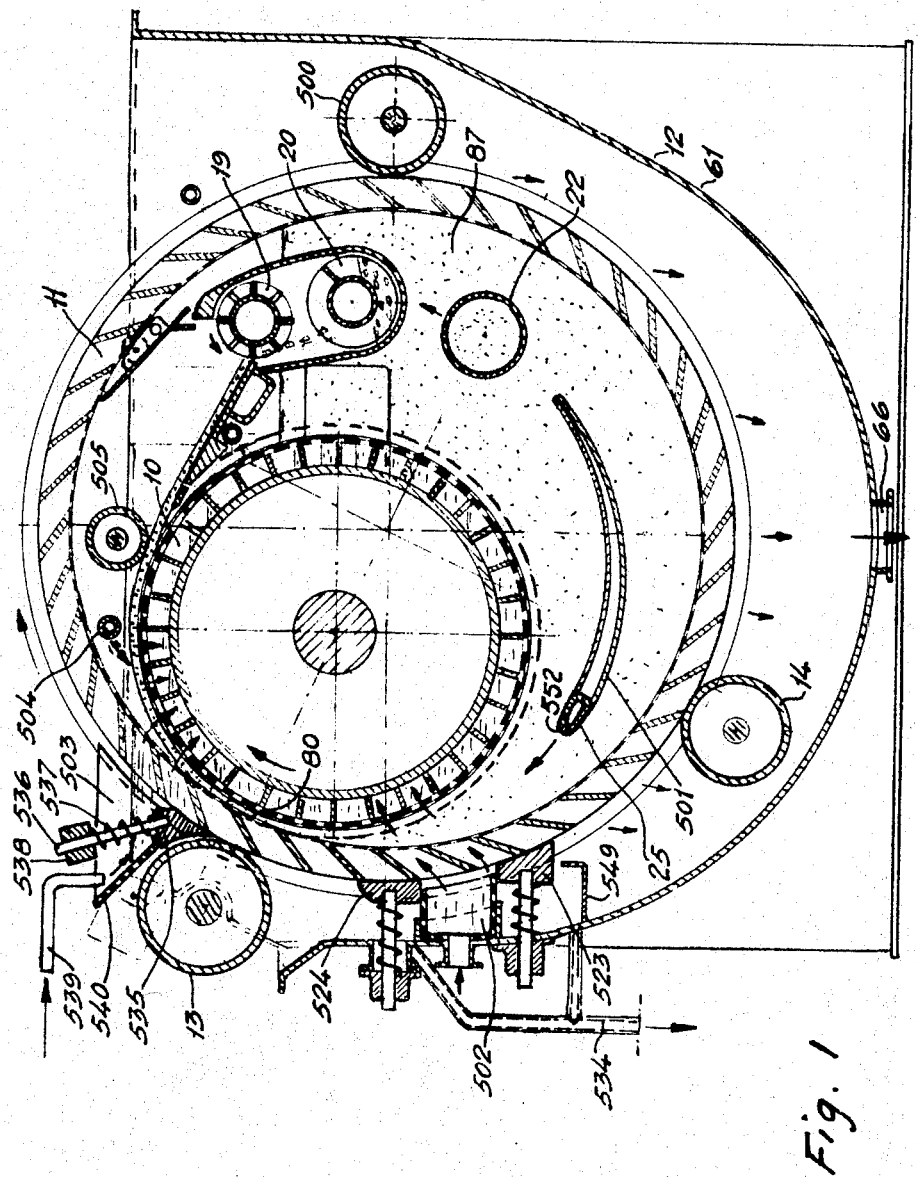

The present invention relates to an apparatus for dewatering and rinsing hydrous substances, preferably fiber pulp suspensions, said apparatus comprising an inner rotary screen drum and an outer rotary screen drum, means for supplying the hydrous substance and means for removing the resulting product and the liquid extracted therefrom, with both screen drums being so disposed that a pressure-nip is formed therebetween.

The apparatus according to the invention will afford a combination of a filtering device and a press with two rotary screen drums, one drum disposed within the other and combined with one or more rinsing devices, the outer screen drum being constructed of an innermost thin screen casing at the outside of which a second perforated casing may be disposed, this structure being reinforced at the outside by spaced supporting members shaped as annuli, or being helically wound of a flat-section strip, their being trailing wall members provided between said annuli, or between the separate windings of the helically wound strip, to define axially adjacent cells which lack communication with each other in the circumferential direction.

It is an object of the invention to provide apparatus affording a highly efficient rinsing action, in one or two steps combined with the possibility of dividing the filtrate in two fractions of different "strength," and at the same time a high-degree dewatering. The apparatus according to the invention is intended normally to yield fiber pulp suspensions with a dry substance percentage of 30 to 45% in one-step rinsing, and of 30 to 45% between, and 15 to 30% after the rinsing steps in two-step rinsing.

A preferred embodiment of the invention will now be described with reference to the drawings.

FIG. 1 is a cross sectional view of a press according to the invention with four different rinsing devices illustrated. Two of these devices are for rinsing before the pressure nip, whereas the other two are for rinsing after the nip, FIG. 2 is an end view of the inner drum as well as filtrate receptacles for both fractions.
FIG. 3 is a longitudinal sectional view on line III—III in FIG. 2,
FIG. 4 is, on a greater scale, a more detailed view of both devices for rinsing before the nip (one device only partly illustrated) and adjacent parts of the press,
FIG. 5 is a longitudinal sectional view on line V—V in FIG. 4,
FIG. 6 is a longitudinal sectional view on line VI—VI in FIG. 4,
FIG. 7 is an end view of a sealing strip, which is provided for two of the rinsing devices,
FIG. 8 is a longitudinal sectional view on line VIII—VIII in FIG. 7 (only one end illustrated, as both end portions are identical), and
FIG. 9 is a partial cross sectional view of the outer drum with but a minor part of the circumference illustrated.

In the drawings numeral 10 denotes an inner screen drum, 11 an outer screen drum, 12 a trough, 13 a pressure roll, 14 a carrier roll and 500 a supporting roll. A tearing device is denoted 19, a screw conveyor 20 and an inlet conduit 22. A pipe member 25 is disposed between the drums and is provided for rinsing before the nip 80 and for diluting the suspension when operation is started up. A dividing wall member 501 extends behind the pipe member 25.

Another device for rinsing before the nip is denoted 502, and a first device for rinsing after the nip is denoted 503, while another device for rinsing after the nip is denoted 504. A pressure roll 505 engages the inner drum 10.

The inner drum 10 is preferably of such a construction that its inside may be submitted to a vacuum, but when rinsing in a single step, that is if only the rinsing means before the nip be used, a drum without arrangements for obtaining an inside vacuum may be provided, instead, as rinsing in two steps would be desirable only in certain processing methods. Thus, the drawings illustrate only that design of the inner drum which would ordinarily be the most advantageous one. It is also possible to use an inner drum lacking suction means, but which is equipped with trailing passages for attaining a vacuum and such an arrangement is disclosed in Patent No. 3,125,514 dated March 17, 1964.

The drum 10 is surrounded by a screen casing or wire gauze 28 supported by a perforated sheet metal cylinder 29. At the inside of the perforated cylinder axially extending cells 262 are provided which open into an annular surface at one end of the drum, a stationary suction box 263 engaging said surface and producing a vacuum in the cells communicating with the suction box. The interior of the suction box is divided by radial walls 511, 512, 513 and 514 into four chambers. Below said dividing walls are provided plates or screens 515, 516, 517 and 518 having a radial and circumferential extension at least as great as the across dimensions of each cell outlet. The chambers 507 and 508 are subjected to a vacuum during operation, and may be connected to a vacuum pump through unions 519, 520 (FIG. 2). In the chambers 509 and 510 there is atmospheric pressure. The suction box chamber 507 communicates with the filtrate tank 544 by the pipe 540, and chambers 508, 509 with the filtrate tank 545 by the pipes 541 and 542. The trough 12 communicates with the filtrate tank 544 (FIG. 2) through the outlet union 66 (FIG. 1) and the pipe 543 (FIG. 2). The liquid that is squeezed through the outer drum 11 between the rinsing device 502 and the pressure roll 13 is conducted by the conduit 534 to the tank 545 (FIG. 2). (If a low level of the suspension 87 is desired for increasing the dry-substance percentage in the output the starting-up may be facilitated if the inner drum is self-sucking. It is possible to attain that by providing each cell with a trailing passage with a circumferential extension of about 300 to 800 millimetres and attention is called to Patent No. 3,125,514. The suction box will then engage the mouth of the passages.) The outer drum 11 is constructed with a view of making possible an efficient rinsing operation, partly under pressure. There are axially adjacent compartments 521 outside the screen casing 39. These compartments are defined between annulus-shaped members 40 or a helically wound strip and circumferentially spaced walls 522 between the members 40. At least one axial row of walls 522 shall seal at any time against a sealing strip engaging the outside of the drum and belonging to the rinsing equipment, and prevents a circumferentially directed communication between said compartments. (Several such sealing strips are provided.) The walls 522 should be trailing to prevent any pockets to form at the nip and directly after the same which might cause liquid which has been squeezed out to be resucked into the pulp web. At the ends of the drum 11 there are provided flanges 44 extending radially beyond the screen casing 39.

The trough 12 is formed of a circumferential wall 61 and end walls 59 and 60. Between the end walls there is provided a gutter 549 which collects liquid having been squeezed through the outer drum between the rinsing device 502 and the nip 80.

The rinsing and diluting member 25 preferably is provided with outlet means adapted to shut automatically when the outside pressure outgrows the inside pressure. A dividing wall member 501 should be provided, connected or adjacent to the member 25 and extending substantially between the end walls 59, 60 of the trough. The circumferential extension of the wall member 501 should be as great as or somewhat smaller than the circumferential distance between the member 25 and the inlet device 22 (or the trough of the screw conveyor 20, if the inlet device is otherwise disposed). There should also be provision for supplying liquid to the interior of dividing wall member 501, such liquid emerging through suitable apertures 552 in the top and bottom side of the wall member and diluting thickened substance mixture after interruptions in the operation. The dividing wall member which has been illustrated as of a streamlined shape, may be otherwise shaped, for instance radially thicker at the end facing the device 22 than at the end facing member 25.

The inlet of rinsing liquid into the rinsing device 502 is denoted 530 (FIG. 4). The elements making up the rinsing device form together with the outer drum 11 a closed structure whereby the rinsing liquid may be supplied under pressure. The rinsing liquid is pressed and sucked through the suspension thickened at that position, and displaces and replaces the liquid present in the suspension. The sealing against the outer drum is effected by two axially extended and similar sealing strips 523 and 524, each having a circumferential extension at least as great as the circumferential spacing of the walls 522. Preferably, the sealing strips are so shaped that they project by an amount A into the rinsing chamber. Due to this disposition a greater rinsing liquid pressure will cause the sealing strips to engage the drum more tightly. As the center line of the outer drum may be moved towards the pressure roll 13, the sealing strips must be movably supported. For that purpose each sealing strip is supported by two or more movable members 525 held by brackets 526. The sealing strips 523, 524 are urged against the drum by compression springs 527 slid over the members 525. (The pressure may instead be afforded by pneumatic or hydraulic means, well known by themselves.) If the distance A is made sufficiently great, the springs only need furnish an initial force. The end faces of the sealing strips sealingly engage the flanges 44 of the drum. It is not necessary, however, to make the end faces of the strips themselves engage said flanges. Instead, the strips may stop short of the flanges and engage the latter by sealing elements 531 partly sunk into the end faces of the sealing strips, and slidable axially of the strip (FIGS. 5 and 8). The space 532 behind the sealing elements 531 communicates through the passage 533 with the rinsing liquid, to make the sealing elements engage the flanges 44 with a pressure force which is dependent on the rinsing liquid pressure. (The space 532 may, of course, communicate with another source of pressure. Another modification is to provide compression springs behind the sealing elements 531.) To afford a closed chamber for the rinsing liquid, a stationary open box 528 is provided, with its opening facing the drum, and with its longitudinal walls slidingly sealing against the sealing strips 523 and 524. The end walls 550 of the box engage the drum flanges 44 slideably and sealingly. The box is preferably made of a resilient material, such as rubber, whereby the box walls are urged by the pressure against the sealing strips and the flanges of the drum. To stiffen this resilient box it is preferably surrounded by a frame 529 secured to the trough 12 (FIGS. 4 and 6).

The object and the functioning of the rinsing device 503 is analogous to those of the device 502, with the difference that it is not, as a rule, desirable to supply the rinsing liquid under pressure. The resilient box 540 (only the end walls or parts thereof need be resilient) thus preferably is open at the top, and preferably also lacks the upper sealing strip. The sealing strip 535 thus functions like the sealing strip 523, and the elements 536, 537 and 538 function like the elements 525, 527 and 526. The rinsing liquid inlet is denoted 539. The parts making up the rinsing device 503 are similar in principle to the corresponding parts of rinsing device 502.

The rinsing device 502 may be open at the top like the illustrated embodiment of rinsing device 503, and the rinsing liquid supplied thus may be devoid of pressure. The two rinsing devices may, as an alternative, be made identical, either like 502, or like 503.

The rinsing device 504 comprises one or more spray tubes, each tube having one or more rows of holes or nozzles. To guide the rinsing liquid as close towards the nip as possible a guide baffle (not illustrated) may be provided below the spray tube or tubes.

For raising the dry-substance percentage after the last rinsing operation an adjustable pressure roll 505 is adapted to engage the inner drum. This pressure roll is not desirable in all processing methods, however.

The operation of the disclosed structures is the following:

The suspension 87 is supplied by the inlet device 22, and the rotation of the drums 10 and 11 is started. On the screen surface of each drum, layers are formed that grow gradually thicker as they advance towards the nip 80. In the nip the dry-substance concentration is raised very materially. Between the both layers before the nip rinsing liquid is added by means of the device 25 prior to the merging of the two layers. (In certain cases it is not deemed useful to add rinsing liquid through the tube 25, but only to use the latter for diluting the suspension before starting up.) When the two layers have been merged, or shortly before that, rinsing liquid is added through the rinsing device 502. Since the rinsing liquid is pressurized, and the cells of the inner drum are submitted to a vacuum, rinsing liquid flows through both layers, and thus partly displaces and replaces the liquid present in the layers. A small volume of rinsing liquid will also penetrate into the inner drum. (The efficiency of this displacement is thought to amount to about 60 to 75%.) At the nip consequently the main portion of the liquid present in the layers is squeezed off. The liquid conveyed to the outside of the outer drum, between the rinsing device 502 and the pressure roll 13, is led by the pipe 534 to the tank 545, and the liquid conveyed into the inner drum is led through the chamber 507 of the suction box and the conduit 540 to the tank 544. Owing to the fact that, in practice, the displacement efficiency does not amount to 100%, and to the fact that the dry-substance percentage after the nip is not 100%, either there will still be liquid present in the pulp layer after the squeezing operation. That liquid substantially is made up of rinsing liquid which has been supplied by the rinsing device 502, and/or possibly the device 25, but also of a proportion of liquid present in the suspension from the outset. By means of rinsing devices 503 and 504 fresh and still more clean rinsing liquid is therefore supplied which is sucked into the pulp layer by the vacuum in the cells of the inner drum, and which shall displace and replace the actual liquid present in the pulp layer. A small proportion of the rinsing liquid last added also moves into the cells of the inner drum. (The devices 503 and/or 504 may also serve for the purpose of reducing the dry-substance percentage of the emerging pulp layer, to make special disintegrating devices after the press unnecessary.) If the pulp layer does not have the desired dry-substance percentage owing to the rinsing after the nip, the outgoing concentration may be raised with the pressure roll 505. Due to the fact that the filtrate from the cells of the inner drum is sucked in the different positions of the latter into different chambers in the suction box, and is guided into different tanks, as well as to the fact that the trough has different chambers, and the filtrate therefrom is led to different tanks, the filtrate 546 in the tank 544 will consist almost wholly of liquid present in the suspension from the outset, whereas the tank 545 mainly holds rinsing liquid from the first-stage rinsing operation. The liquid present in the outgoing pulp layer thus will mainly consist of rinsing liquid from the second-stage rinsing operations. (The rinsing effected before the nip is referred to as first-stage rinsing, and the rinsing after the nip is referred to as second-stage rinsing in a two-stage rinsing operation.) In practice, it would be preferable to pump the filtrate 547 to the first-stage rinsing devices.

The dividing wall member 501 has a twofold object. Firstly, it shall prevent thickened suspension from forming an obstruction before the device 25 after operation interruptions and stops. Secondly, it should act as a diluting device when operation has been resumed after a stop.

The invention is not restricted to the embodiments which have been disclosed; many modifications being possible. Of course, only a single one of the rinsing devices disclosed need be provided. It is also possible to substitute one or two of the disclosed rinsing devices for the other. The dividing wall member 501 may be relinquished, and instead the tube 25 may be provided with outside disintegrating means; the tube must then be rotative. (The disintegrating means upon rotation of the tube will stir the suspension tending to block the passage.) A rotary roll with external disintegrating means disposed before the device 25 may also be substituted for the dividing wall member. One or more spray tubes disposed outside the outer drum and after the pressure roll 13 may be substituted for supply rinsing or diluting liquid. The outer drum 11 may be modified in such a manner that a stiffer perforated sheet metal wall 548 is provided inside the thin wall or wire gauze 39. In such case the drum will cost less to manufacture, but the dry-substance percentage after the press will be reduced.

What I claim is:

1. An apparatus for high degree dewatering and rinsing of hydrous substances, preferably fiber pulp suspensions, comprising an inner rotary screen drum and an outer rotary screen drum, means provided in the space between said drums for supplping the hydrous substance, further means provided in the space between said drums and beneath said outer drum for removing the resulting product and the liquid removed therefrom, said screen drums being so disposed that a nip is formed therebetween, said outer screen drum being defined by an inner, thin screen casing which may be surrounded by an outside perforated wall, said drum being provided at the outside with spaced annulus-shaped members with a relatively great height to width ratio constituting stiffening means and trailing wall members provided between adjacent stiffening means to define together with the latter, cell structures having no circumferential intercommunication.

2. In an apparatus as claimed in claim 1 including means for subjecting said inner drum to an interior vacuum.

3. An apparatus as claimed in claim 1, wherein a trough is provided which surrounds at least partly said outer drum, and suction box means is provided for said inner drum, said trough and said suction box means being partitioned in such a way that filtrates of different strength may be led to different receptacles.

4. An apparatus as claimed in claim 1 wherein a rinsing device is provided before a pressure roll, said rinsing device being provided with two sealing strips extending over the length of the drum and adapted to be urged radially against said outer drum, said sealing strips having a width which corresponds at least to the circumferential spacing of said trailing wall members of the outer drum.

5. An apparatus as claimed in claim 4, wherein there is provided a box with resilient walls sealingly engaging the sealing strips and having resilient end walls sealingly engaging the end walls of said outer drum.

6. An apparatus as claimed in claim 5, wherein the sealing strips project by part of their width into the chamber submitted to the pressure of the rinsing liquid for increasing the surface pressure between the sealing strips and the outer drum in dependence of pressure rises in the rinsing liquid.

7. An apparatus as claimed in claim 6, wherein there are axially displaceable flat sealing elements partly sunk into the end portions of the sealing strips, the spaces behind these sealing elements communicating with a pressure exerting means for urging said sealing elements outwards.

8. An apparatus as claimed in claim 7, wherein a rinsing device is provided also after the pressure roll at the outside of the outer drum.

9. An apparatus as claimed in claim 4, wherein a rinsing device is disposed at the outside of the outer drum after the pressure roll, said rinsing device comprising at least one spray tube for adding rinsing liquid and extending over the whole width of drum.

10. In an appartus as claimed in claim 4 the provision of a rinsing device, comprising at least one rinsing liquid spray tube disposed beyond the nip and between said inner and outer drums.

11. An apparatus as claimed in claim 10, wherein a dividing wall member is disposed between said inner and outer drums, the axial extension of said wall member being as great as the spacing of the end walls of the trough.

12. An apparatus as claimed in claim 11, wherein said dividing wall member is hollow and has apertured faces for supplying rinsing or diluting liquid.

13. An apparatus as claimed in claim 12, wherein a pressure roll is provided between the inner and outer drum beyond the nip, to raise the dry-substance percentage of the outgoing product.

References Cited

UNITED STATES PATENTS

| | | | |
|---|---|---|---|
| 2,229,143 | 1/1941 | Stacom | 100—157 |
| 3,014,589 | 12/1961 | Frykhult | 210—404 X |
| 3,086,454 | 4/1963 | Asplund | 100—121 |
| 3,220,340 | 11/1965 | Frykhult | 100—121 |

FOREIGN PATENTS 96,482   8/1939   Sweden.

WILLIAM I. PRICE, *Primary Examiner.*